United States Patent [19]
Kleifges et al.

[11] Patent Number: 5,779,017
[45] Date of Patent: Jul. 14, 1998

[54] FRICTION CLUTCH FOR A MOTOR VEHICLE

[75] Inventors: Jürgen Kleifges, Schweinfurt; Bernhard Schierling, Kürnach; Harald Jeppe, Schweinfurt, all of Germany

[73] Assignee: Fichtel & Sachs AG, Schweinfurt, Germany

[21] Appl. No.: 636,191

[22] Filed: Apr. 22, 1996

[30] Foreign Application Priority Data

Apr. 21, 1995 [DE] Germany ............ 195 14 817.7

[51] Int. Cl.⁶ .................................................. F16D 13/64
[52] U.S. Cl. ............... 192/52.6; 192/70.14; 192/107 C
[58] Field of Search .......................... 192/70.14, 70.27, 192/107 C, 107 R, 52.6

[56] References Cited

U.S. PATENT DOCUMENTS

| | | | |
|---|---|---|---|
| 1,524,771 | 2/1925 | Wood | 192/70.14 X |
| 2,053,622 | 9/1936 | Manning | 192/70.14 X |
| 2,162,071 | 6/1939 | Eason | 192/70.27 X |
| 2,234,755 | 3/1941 | Geyer | 192/70.27 |
| 2,448,879 | 9/1948 | Gamble | 192/107 C |
| 3,171,527 | 3/1965 | Ott | 192/107 R X |
| 3,548,988 | 12/1970 | Armstrong | 192/107 R |
| 3,624,770 | 11/1971 | Fujita et al. | 192/107 C X |
| 3,717,230 | 2/1973 | Hartmann | 192/70.14 X |
| 3,936,552 | 2/1976 | Krupp et al. | |
| 4,445,607 | 5/1984 | Knight | 192/107 C |
| 4,811,826 | 3/1989 | Kittel et al. | 192/70.27 X |
| 5,358,086 | 10/1994 | Muller et al. | |
| 5,551,549 | 9/1996 | Cooke et al. | 192/107 R |

FOREIGN PATENT DOCUMENTS

| | | |
|---|---|---|
| 0554472 | 8/1993 | European Pat. Off. . |
| 0665388 | 8/1995 | European Pat. Off. . |
| 0542434 | 8/1922 | France . |
| 2302808 | 7/1973 | Germany . |
| 3224436 | 1/1983 | Germany . |
| 55-5784 | 2/1980 | Japan . |
| 45521 | 4/1992 | Japan . |

*Primary Examiner*—Rodney H. Bonck
*Attorney, Agent, or Firm*—Nils H. Ljungman and Associates

[57] ABSTRACT

A friction clutch for a motor vehicle, which friction clutch has friction surfaces on the centrifugal mass and on the application plate, whereby the clutch disc is provided with friction lining rings which have an essentially constant material thickness over their radial extent or dimension. The matching friction surfaces extend at least in one radial direction beyond the friction surfaces, and are riveted to a carrier in this area.

19 Claims, 6 Drawing Sheets

FRICTION CLUTCH FOR A MOTOR VEHICLE

BACKGROUND OF THE INVENTION

1. Field of the Invention

The present invention generally relates to a friction clutch for a motor vehicle, including a centrifugal mass which is effectively and operationally connected to the crankshaft of an internal combustion engine. The centrifugal mass has a ring-shaped friction surface, a clutch housing fastened to the centrifugal mass, and an application plate or pressure plate which is installed non-rotationally in the clutch housing but which can move axially. The application plate has a ring-shaped friction surface which essentially axially overlaps or covers the friction surface of the centrifugal mass. The friction clutch also includes a clutch spring to apply an axial force to the application plate toward the centrifugal mass, with the interposition of a clutch disc. The clutch disc includes friction lining rings which are non-rotationally connected to a hub, the connection may be configured to include the interposition of a torsional damping device.

2. Background Information

A similar friction clutch is described, for example, in Unexamined German Pat. Application No. 23 02 808. In this embodiment, there are two friction lining rings which are riveted to a carrier, namely in the vicinity of the friction surfaces of the flywheel or application plate. As a result of such a design it is specified a priori that the friction lining rings can only be worn until the friction surfaces of the application plate or the flywheel come into contact with the heads of the rivets. The remaining portions of the friction lining rings must then be disposed of, unused. That results in high costs, since the friction lining rings represent a major component of the cost of the overall clutch disc.

OBJECT OF THE INVENTION

The object of the present invention is to realize a clutch disc with riveted friction lining rings, so that the greatest possible wear volume is available, and the volume remaining after the normal useful life of the clutch is as small as possible.

SUMMARY OF THE INVENTION

The present invention teaches that this object can be accomplished by the fact that there is a carrier which is non-rotationally connected to the hub, with the carrier extending, starting from the hub, outward into the area of the friction surfaces. Each side of the carrier has a friction lining ring with corresponding matching or mating friction surfaces, whereby the two friction lining rings have an essentially constant material thickness over their radial extension. Each friction lining ring extends in at least one radial direction beyond the friction surfaces, and each friction lining ring is riveted to the carrier in this area.

As a result of the displacement of the fastening areas in the radial direction beyond the friction surfaces, it is possible to provide the friction lining rings from the outset with a material thickness so that the thickness of the friction linings is only slightly greater - if at all - than the allowable wear. Thus the mass moment of inertia of the clutch disc can be significantly reduced, since the friction linings are at the maximum distance from the axis of rotation. The manufacture of the clutch disc can also become significantly cheaper, since the friction lining rings are simple to manufacture and have a relatively small volume. In addition, the matching or mating friction surfaces of the friction lining rings are realized without interruptions over essentially their entire active surface, which improves both their stability and the wear volume.

In accordance with an additional characterizing feature of the present invention, it is advantageous if the carrier includes individual lining springs, which individual lining springs are distributed around the periphery, and which lining springs have, inside the friction surfaces, tabs which point or extend in the peripheral direction, and webs which extend essentially radially and create the connection to the hub or to the torsional damper. There can also be rivet holes at least in tongues which project radially out of the tabs, which tongues extend to radially outside the friction surfaces. As a result of the use of lining springs it is possible on one hand to realize an axial spring system between the friction lining rings, which significantly improves, among other things, the smoothness of starting, and on the other hand it becomes possible to use tabs to locate rivet holes at a very small additional expenditure of time, effort and money.

It is thereby possible to advantageously also provide a rivet hole in the web of the lining springs, so that it is possible to omit at least one separate tab for this rivet hole.

As a result of the location of recesses on the application plate and on the centrifugal mass in the area in which the friction lining rings extend radially beyond the friction surfaces, and whereby the recesses make a transition by means of an inclination into the friction surfaces at an obtuse angle, it is possible to maintain the operational reliability and safety of the friction clutch, primarily with regard to the correct release action, even when there is increasing wear to the friction linings.

The edges can thereby be interrupted or discontinuous in the vicinity of the transition from the inclinations to the friction surfaces. This measure reduces, in a particularly simple manner, the notch effect between the partly worn area of the friction lining ring and the area which is not exposed to wear.

The present invention also teaches that it is advantageous if the carrier is realized in the form of a flat sheet metal part with friction lining rings located on both sides, whereby radially inside and/or radially outside the projections of the friction surfaces, rivets connect the one or the other friction lining ring with the carrier. With such a design, both the manufacturing cost and the mass moment of inertia can be kept advantageously low.

In accordance with an additional advantageous embodiment, each friction lining ring has notches which are offset peripherally in relation to the fastening openings, and the two friction lining rings are offset peripherally so that each rivet can preferably be in contact, by means of its set head, with the outside of the one friction lining ring, and with its shank the rivet penetrates the fastening openings and the rivet hole, and with its closing head is in contact with the side of the carrier farther from the friction lining ring, and is located in the notch of the other friction lining ring. Such a configuration makes a simple riveting operation possible by placing the set head in contact with the outside of the friction lining ring, and performing the riveting on the opposite side, whereby this type of fastening is particularly recommended when the fastening openings in the friction lining ring are realized in the form of slots which are open in the radial direction.

One aspect of the invention resides broadly in a friction clutch for a motor vehicle, the friction clutch comprising: a flywheel, the flywheel having an axis of rotation defining an axial direction parallel to the axis of rotation; the flywheel comprising an annular shaped friction surface; the flywheel friction surface having a first inner radius and a first outer radius; a clutch housing; a clutch disc; a pressure plate for engaging and disengaging the clutch disc with the flywheel; the pressure plate comprising an annular shaped friction surface; the pressure plate friction surface having a second inner radius and a second outer radius; the clutch disc being disposed between the flywheel and the pressure plate; a device for fastening the pressure plate to the clutch housing; a device for engaging the pressure plate and the flywheel with the clutch disc; the clutch disc comprising: a hub; a friction lining device; a carrier device for connecting the friction lining device to one of the hub and a torsional damper disposed at the hub; the friction lining device comprising a first portion; the first portion having a first friction surface; the friction lining device comprising a second portion adjacent to the first friction surface; the first friction surface having an annular shape; the first friction surface having a third inner radius and a third outer radius; the third inner radius of the first friction surface being adjacent to the first inner radius of the flywheel; the third outer radius of the first friction surface being adjacent to the first outer radius of the flywheel; the first friction surface being substantially in contact with the flywheel upon engagement of the clutch disc; the friction lining device comprising a third portion; the third portion having a second friction surface; the friction lining device comprising a fourth portion adjacent to the second friction surface; the second friction surface having an annular shape; the second friction surface having a fourth inner radius and a fourth outer radius; the fourth inner radius of the second friction surface being adjacent to the second inner radius of the pressure plate; the fourth outer radius of the second friction surface being adjacent to the second outer radius of the pressure plate; the second friction surface being substantially in contact with the pressure plate upon engagement of the clutch disc; a device for connecting the friction lining device to the carrier device; the first portion, having the first friction surface disposed thereon, being without metal fastening elements therein; the third portion, having the second friction surface disposed thereon, being without metal fastening elements therein; the first outer radius of the flywheel friction surface being substantially greater than the first inner radius of the flywheel friction surface; the second outer radius of the pressure plate friction surface being substantially greater than the second inner radius of the pressure plate friction surface; the third outer radius of the first friction surface being substantially greater than the third inner radius of the first friction surface; and the fourth outer radius of the second friction surface being substantially greater than the fourth inner radius of the second friction surface.

Another aspect of the invention resides broadly in a friction clutch for a motor vehicle, the friction clutch comprising: a flywheel, the flywheel having an axis of rotation defining an axial direction parallel to the axis of rotation; the flywheel comprising an annular shaped friction surface; the flywheel friction surface having a first inner radius and a first outer radius; a clutch housing; a clutch disc; a pressure plate for engaging and disengaging the clutch disc with the flywheel; the pressure plate comprising an annular shaped friction surface; the pressure plate friction surface having a second inner radius and a second outer radius; the clutch disc being disposed between the flywheel and the pressure plate; a device for fastening the pressure plate to the clutch housing; a device for engaging the pressure plate and the flywheel with the clutch disc; the clutch disc comprising: a hub; a friction lining device; the friction lining device comprising at least one friction lining ring; a carrier device for connecting the friction lining device to one of the hub and a torsional damper disposed at the hub; the friction lining device comprising a first portion; the first portion having a first friction surface; the friction lining device comprising a second portion adjacent to the first friction surface; the first friction surface having an annular shape; the first friction surface having a third inner radius and a third outer radius; the third inner radius of the first friction surface being adjacent to the first inner radius of the flywheel; the third outer radius of the first friction surface being adjacent to the first outer radius of the flywheel; the first friction surface being substantially in contact with the flywheel upon engagement of the clutch disc; the friction lining device comprising a third portion; the third portion having a second friction surface; the friction lining device comprising a fourth portion adjacent to the second friction surface; the second friction surface having an annular shape; the second friction surface having a fourth inner radius and a fourth outer radius; the fourth inner radius of the second friction surface adjacent to the second inner radius of the pressure plate; the fourth outer radius of the second friction surface being adjacent to the second outer radius of the pressure plate; the second friction surface being substantially in contact with the pressure plate upon engagement of the clutch disc; a device for connecting the friction lining device to the carrier device; the device for connecting being disposed at the second portion; the device for connecting being disposed at the fourth portion; the first outer radius of the flywheel friction surface being substantially greater than the first inner radius of the flywheel friction surface; the second outer radius of the pressure plate friction surface being substantially greater than the second inner radius of the pressure plate friction surface; the third outer radius of the first friction surface being substantially greater than the third inner radius of the first friction surface; and the fourth outer radius of the second friction surface being substantially greater than the fourth inner radius of the second friction surface.

Yet another aspect of the invention resides broadly in a friction clutch for a motor vehicle, the friction clutch comprising: a flywheel, the flywheel having an axis of rotation defining an axial direction parallel to the axis of rotation; the flywheel comprising an annular shaped friction surface; the flywheel friction surface having a first inner radius and a first outer radius; a clutch housing; a clutch disc; a pressure plate for engaging and disengaging the clutch disc with the flywheel; the pressure plate comprising an annular shaped friction surface; the pressure plate friction surface having a second inner radius and a second outer radius; the clutch disc being disposed between the flywheel and the pressure plate; a device for fastening the pressure plate to the clutch housing; a device for engaging the pressure plate and the flywheel with the clutch disc; the clutch disc comprising: a hub; a friction lining device; the friction lining device comprising at least one friction lining ring; a carrier device for connecting the friction lining device to one of the hub and a torsional damper disposed at the hub; the friction lining device comprising a first portion; the first portion having a first friction surface; the friction lining device comprising a second portion adjacent to the first friction surface; the first friction surface having an annular shape; the first friction surface having a third inner radius and a third outer radius; the third inner radius of the first friction surface being adjacent to the first inner radius of the flywheel; the third outer radius of the first friction surface being adjacent to the first outer radius of the flywheel; the first friction surface being substantially in contact with the flywheel upon engagement of the clutch disc; the friction lining device comprising a third portion; the third portion having a second friction surface; the friction lining device comprising a fourth portion adjacent to the second friction surface; the second friction surface having an annular shape; the second friction surface having a fourth inner radius and a fourth outer radius; the fourth inner radius of the second friction surface being adjacent to the second inner radius of the pressure plate; the fourth outer radius of the second friction surface being adjacent to the second outer radius of the pressure plate; the second friction surface being substantially in contact with the pressure plate upon engagement of the clutch disc; a plurality of metal fastening elements connecting the friction lining device to the carrier device; at least one of the metal fastening elements being disposed at the second portion; at least one of the metal fastening elements being disposed at the fourth portion; the first outer radius of the flywheel friction surface being substantially greater than the first inner radius of the flywheel friction surface; the second outer radius of the pressure plate friction surface being substantially greater than the second inner radius of the pressure plate friction surface; the third outer radius of the first friction surface being substantially greater than the third inner radius of the first friction surface; and the fourth outer radius of the second friction surface being substantially greater than the fourth inner radius of the second friction surface.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to the embodiments illustrated in the accompanying drawings, in which.

DESCRIPTION OF THE PREFERRED EMBODIMENT

Figure 1:
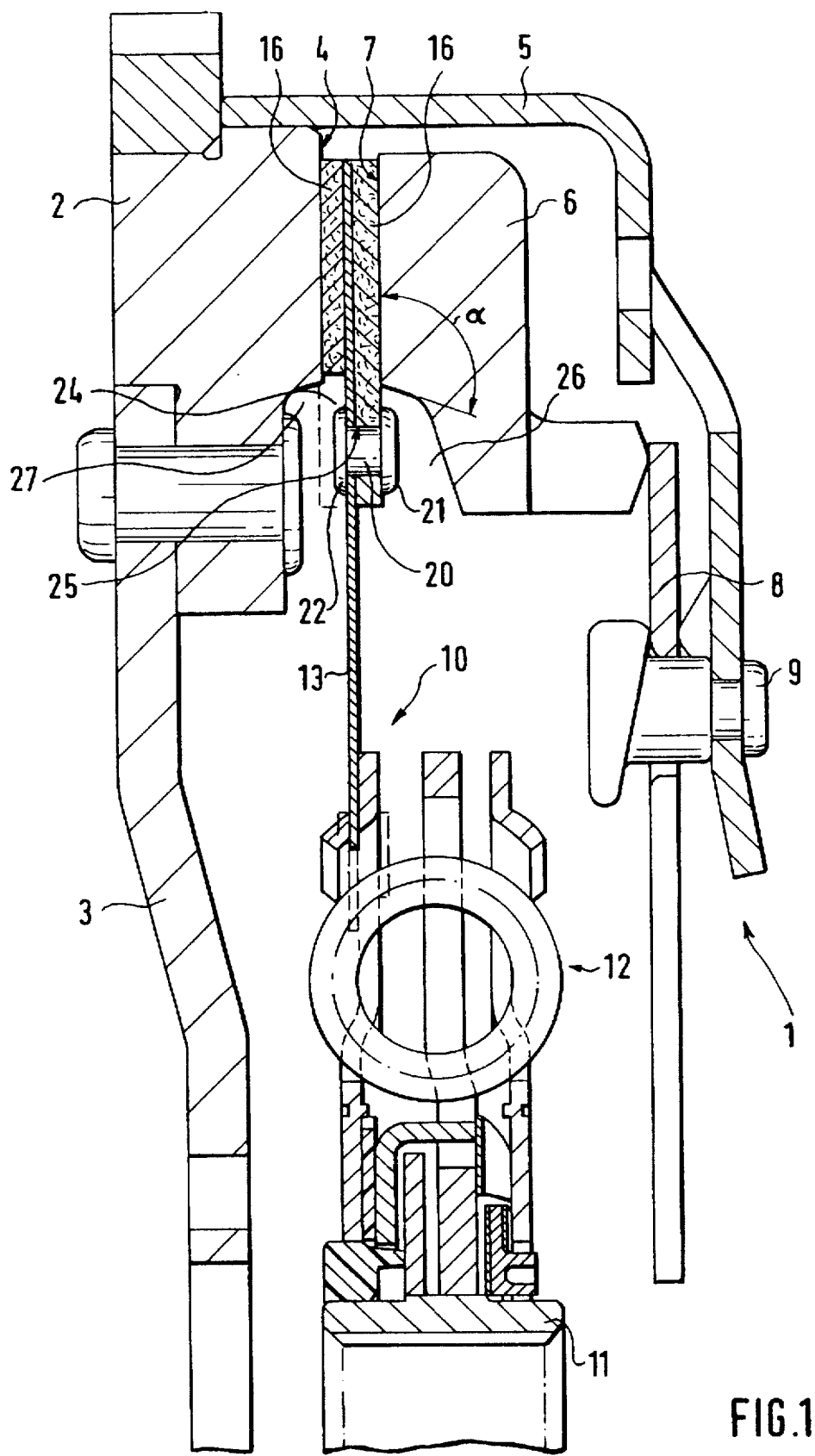
FIG. 1 shows the upper half of a longitudinal section through a friction clutch.

FIG. 1 shows a schematic diagram of a friction clutch 1. The friction clutch 1 can preferably include a centrifugal mass 2 which, in this case, is fastened by means of a disc 3 to a crankshaft (not shown) of an internal combustion engine. It goes without saying that the centrifugal mass 2 can be connected, in a manner not described in any further detail, by means of a torsion damping device with an additional centrifugal mass which is fastened directly to a crankshaft. Fastened to the centrifugal mass 2 is a clutch housing 5, which clutch housing 5 includes an application plate or pressure plate 6. The pressure plate 6 can be displaced axially, but is non-rotationally connected to the clutch housing 5, e.g. by means of tangential leaf springs (not shown). Tangential leaf springs are well known in the art and will therefore not be discussed further here. The clutch housing 5 also includes a membrane spring 8 which is supported on one hand by means of spacer bolts 9 on the clutch housing 5, and on the other hand is in contact with the application plate 6, and applies a force to the application plate 6 in the direction of the centrifugal mass 2. The application plate 6 and centrifugal mass 2 are provided with ring-shaped friction surfaces 7 and 4 respectively, which friction surfaces 7 and 4 are essentially aligned with one another axially.

The friction clutch 1 can also include a hub 11, a clutch disc 10 having friction lining rings 16. The friction lining rings 16 of the clutch disc 10 can be clamped between the application plate 6 and the centrifugal mass 2. The clutch disc 10 has a non-rotational connection between the friction lining rings 16 and the hub 11, which hub 11 is fastened non-rotationally on a transmission shaft (not shown). In other words, and in accordance with one embodiment, the friction lining rings 16 can preferably be non-rotationally fastened to the hub 11. Included in this non-rotational connection, in this case, is a carrier 13, between which carrier 13 and the hub 11 there is also a torsional damper 12. The carrier 13, in its radially inner area, is connected to a component of the torsional damper 12, or this component of the torsional damper 12 is extended radially outward far enough that it can directly perform the function of the carrier 13. In this case, the carrier 13 is extended radially outward so that it essentially coincides with the outside diameters of the friction lining rings 16.

Figure 4:
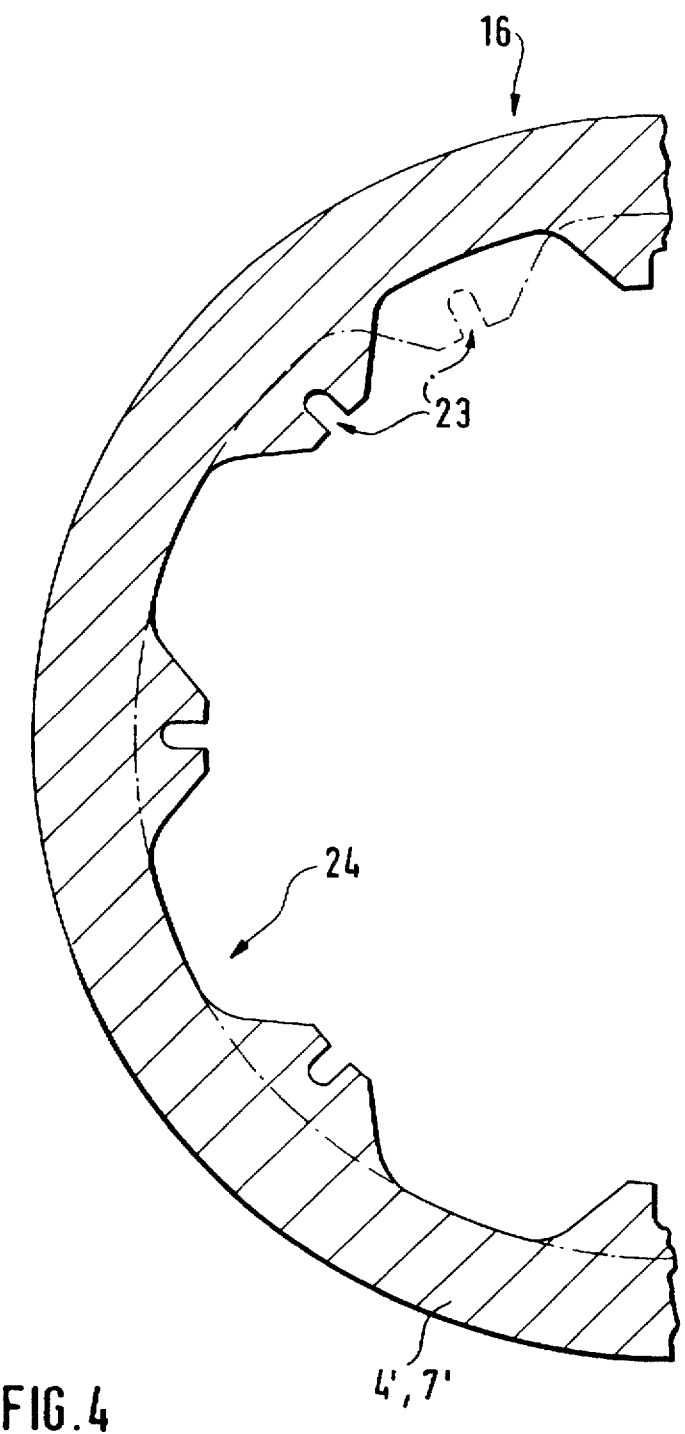
FIG. 4 shows a partial view of a friction lining ring with fastening openings which are open toward the radial inside.

The two friction lining rings 16 have matching friction surfaces 4' and 7' (see FIG. 2) which correspond to the friction surfaces 4 of the centrifugal mass 2 and to the friction surface 7 of the application plate 6, respectively. In other words, friction surface 4' of the friction lining rings 16 contacts friction surface 7 of the application plate while friction surface 7' of the friction lining rings 16 contacts friction surface 4 of the centrifugal mass 2, when the friction clutch is engaged. The friction lining rings 16 are extended radially inward beyond the matching friction surfaces 4' and 7' respectively, and in this area the friction lining rings 16 are riveted to the carrier 13. For this purpose, the carrier 13 has rivet openings 25 which correspond to fastening openings 23 (see FIG. 4) in the friction lining rings 16. In this context, FIG. 4 shows a partial view of a friction lining ring 16 which extends radially inward beyond the matching friction surfaces 4' and 7' respectively, and at that point has the fastening openings 23 which are open toward the radial inside. Peripherally offset from these fastening openings 23, there are notches 24. On one hand, these notches 24 are used to reduce the weight of the friction lining ring 16, and on the other hand make it possible to make the two identical friction lining rings 16 overlap by rotating them in the peripheral direction, so that each fastening opening 23 corresponds to a notch 24. In other words, and in accordance with one embodiment, each fastening opening of one friction lining ring 16 can preferably be circumferentially aligned with a notch 24 of the other friction lining ring 16. It thereby becomes possible to insert rivets 20 as illustrated in FIG. 1. At each fastening point, a rivet 20 is introduced, starting with its shank, through the fastening opening 23 in the friction lining ring 16, so that its set head 21 comes into contact on the outside of the friction lining ring 16. The shank also penetrates the rivet opening 25 in the carrier 13 and is riveted on the side of the carrier 13 farther from the friction lining ring 16. The closing head 22 of the rivet 20 thereby comes to lie in the notch 24 of the friction lining ring 16 located opposite it.

Figure 2:
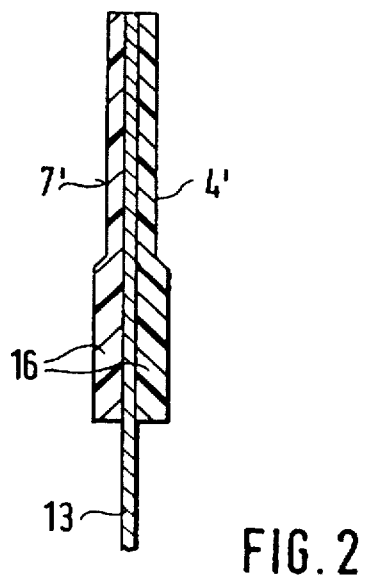
FIG. 2 shows a partial section through worn friction lining rings as illustrated in FIG. 1.

FIG. 1 also shows that in the vicinity of the fastening openings 23 and of the notches 24 of the friction lining rings 16, the application plate 6 can be provided with a recess 26, and the centrifugal mass 2 can also be provided with a recess 27. These recesses 26, 27 can preferably end in an inclination which makes a transition at an obtuse angle (alpha) into the friction surfaces 4 and 7 respectively. As shown in FIG. 2, which illustrates the worn friction lining rings 16, it is apparent that during the operation of the friction clutch 1, and as the wear of the friction lining rings 16 increases, a step can be formed in the friction lining rings 16, which step corresponds to the inclination or slope of the recesses 26 and 27. As a result of this configuration, even after wear has occurred, the correct release of the clutch disc 10 can essentially be guaranteed, since a cylindrical shoulder is not formed on which the application plate 6 can get stuck, or by means of which the clutch plate or disc 10 can get stuck on the centrifugal mass 2. In other words, and in accordance with one embodiment, since, after wear has occurred to the friction lining rings 16, a cylindrical shoulder will not be formed in the friction lining rings 16, the application plate 6 and/or clutch disc 10 essentially will not get stuck. Preferably, the inclinations in the application plate 6 and in the centrifugal mass 2 can be interrupted at the transition into the friction surfaces 7 and 4 respectively, so that no sharp edges are formed in this location. As a result of this configuration, it is possible to use the friction lining rings 16 until the wear in the vicinity of their matching friction surfaces 4' and 7' respectively extends almost down to the carrier 13. The fastening areas between the friction lining rings 16 and the carrier 13 are therefore essentially unaffected by the wear.

Figure 5:
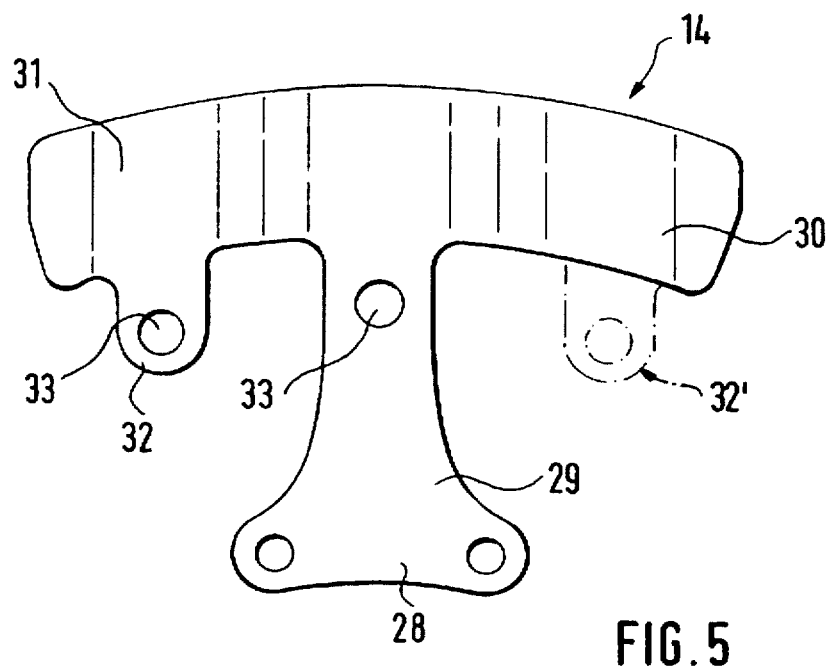
FIGS. 5 and 6 show views of two different carriers in the form of lining springs.
Figure 6:
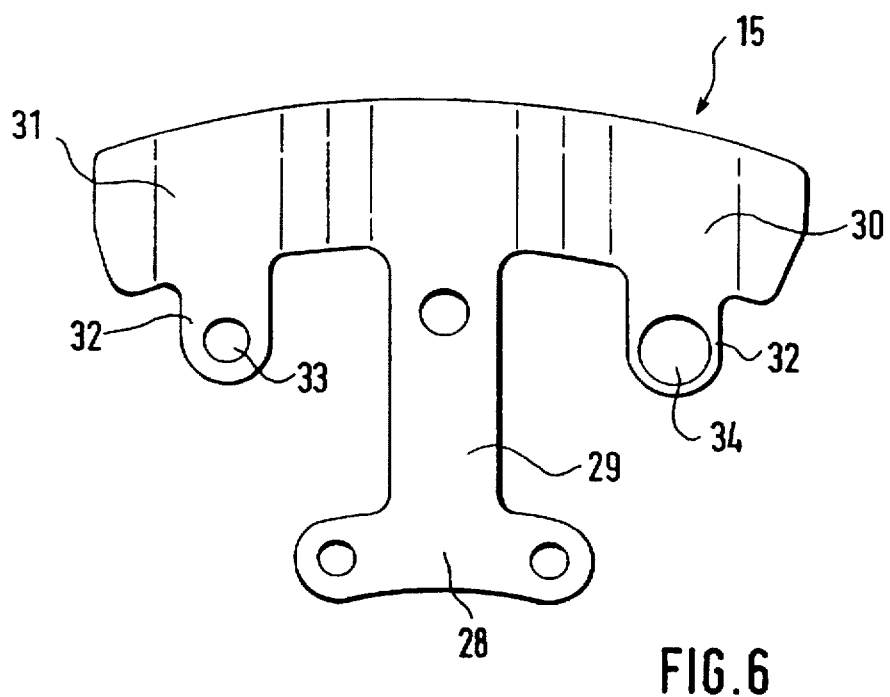

FIGS. 5 and 6 show a lining spring 14 and 15 respectively, in the form of springs which can be used instead of the carrier 13. The lining spring 14 is provided with a web 29 which extends essentially radially, and which ends radially inward in a foot 28. By means of this foot 28, the lining spring 14 is either connected directly to the hub 11 or to a component of the torsional damper 12. Toward the radial outside, the web 29 is located adjacent to tabs 30 and 31 in both peripheral directions, whereby these tabs 30 and 31 correspond in the axial direction essentially to the friction surfaces 4 and 7 respectively, or to the matching friction surfaces 4' and 7' respectively. The tabs 30 and 31 can each be corrugated in the peripheral direction, to make possible an axial resilience or compliance of the two friction lining rings 16 in relation to one another. In this case, a tongue 32 extends radially inward from the tab 31, which tongue 32 has a rivet hole 33. An additional rivet hole 33 is located in the web 29. But it is also possible without any additional measures, to provide a tongue 32' on the tab 30, which tongue 32' is appended either to the web 29 instead of the tab 30 or to both the tab 30 and web 29. A plurality of lining springs 14 are fastened, alternating with one another in the peripheral direction, and the two friction lining rings 16 are riveted alternately to the one lining spring or to the other from both sides, as shown in FIG. 1.

Figure 3:
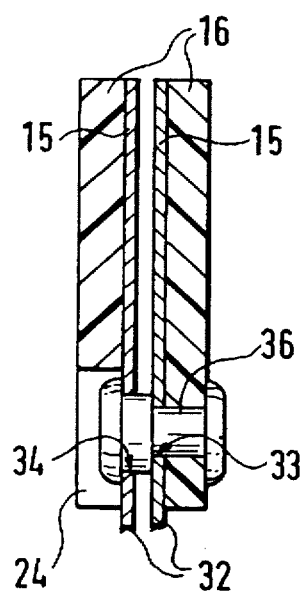
FIG. 3 shows a partial section through axially spring-mounted friction lining rings.

FIG. 6 shows a lining spring 15 which is provided for a two-sided system. In such a system, each two lining springs 15 are installed symmetrically in relation to one another, whereby there are different openings in the tongues 32 which extend radially inward and extend out of the tabs 30 and 31 respectively. In the one tongue 32, there is a rivet hole 33, and in the other tongue 32 there is an opening 34, whereby these two openings 33 and 34 are explained in greater detail with reference to FIG. 3. FIG. 3 shows a section through the two friction lining rings 16 which are installed in connection with lining springs 15. The lining springs 15 are thereby shown in the rebound state, corresponding to the released friction clutch 1. The maximum release distance of the two friction lining rings 16 is specified by a corresponding stepped or multi-diameter rivet 36. These rivets 36 are designed so that they have a shank which has two different diameters. The stepped rivet 36, with its smaller shank diameter, runs or extends through the fastening opening 23 of the friction lining ring 16 as shown in FIG. 4, and also the rivet hole 33 in the one lining spring 15. Adjacent to the smaller diameter shank, the rivet shank is provided with a larger diameter, so that this larger diameter can be used to rivet a lining spring 15 to the corresponding friction lining ring 16. The larger diameter shank of the stepped rivet 36 runs through the opening 34 in the other tongue 32 of the other lining spring 15, and is connected to the back of this tongue 32 by means of its other rivet head. Thus, on one hand, a specified bias between the two lining springs 15 can be achieved, and on the other hand, there is a limitation of the rebound when the friction clutch is released.

Figure 7:
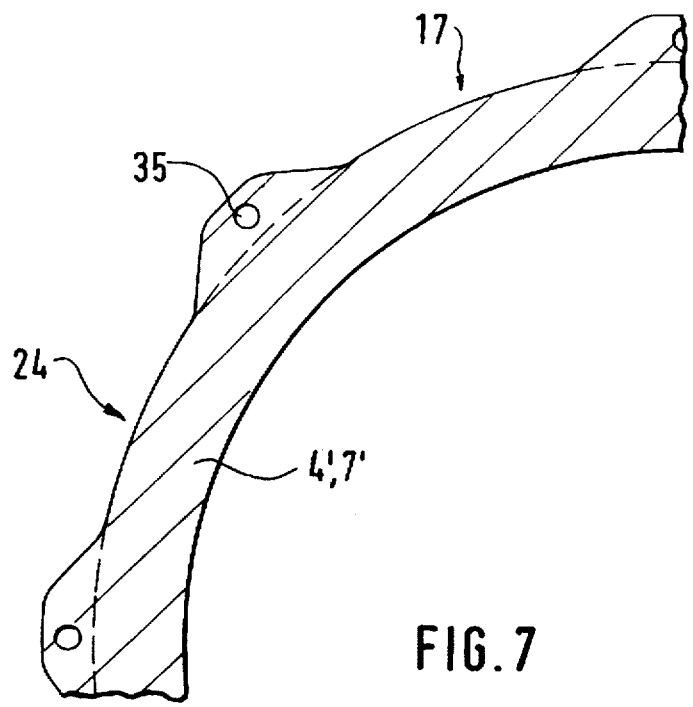
FIGS. 7 to 9 show partial views of different friction lining rings.
Figure 8:
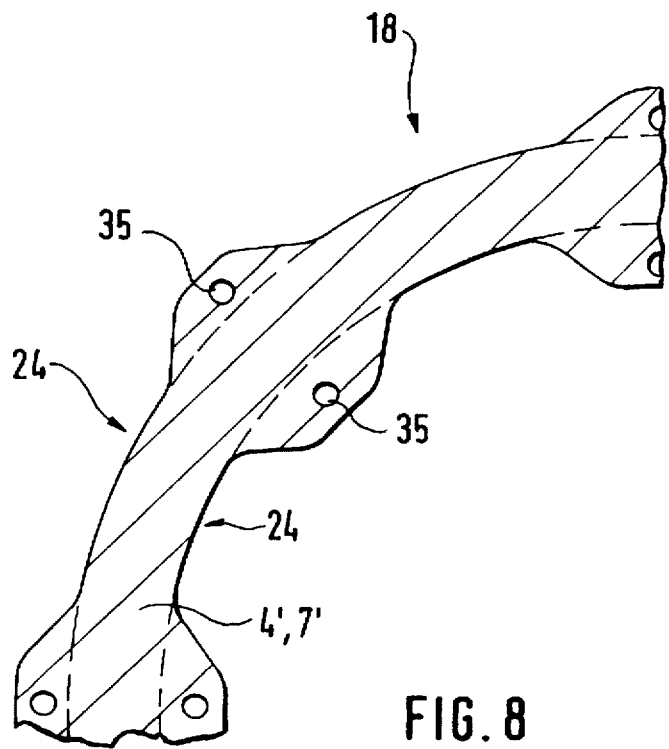
Figure 9:
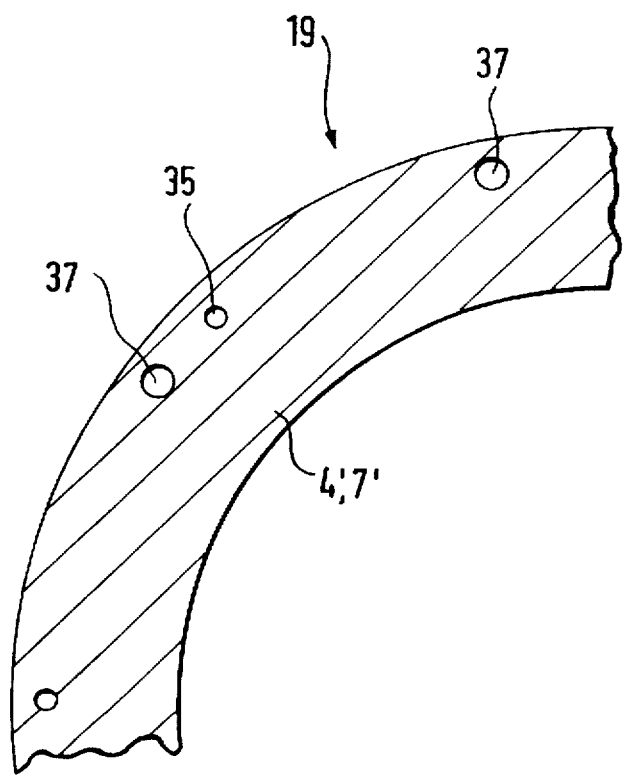

FIGS. 7 to 9 illustrate different embodiments of friction lining rings 17 and 18. For example, the friction lining ring 17 illustrated in FIG. 7 is designed so that the fastening openings 35 and the notches 24 extend radially outward beyond the matching friction surfaces 4' and 7' respectively. With such a connection of the friction lining rings 17, an improved torque transmission into the carrier becomes possible, since a larger diameter is available.

As illustrated in FIG. 8, the friction lining ring 18 is realized so that there are fastening openings 35 and notches 24 located both radially outside and radially inside the matching friction surfaces 4' and 7' respectively. In such a case, a double connection can be made, which can be advantageous, especially with torques which are particularly high.

FIG. 9 illustrates a friction lining ring 19 which has its fastening openings 35 radially outside the matching friction surfaces 4' and 7', and which has an uninterrupted encircling outside diameter. For this purpose, offset in the peripheral direction from the individual fastening openings 35 there are notches 37 which perform the function of the notches 24. Such a configuration contributes improved torque transmission capabilities, along with a friction lining ring which is particularly simple to manufacture.

One feature of the invention resides broadly in the friction clutch for a motor vehicle comprising a centrifugal mass which is effectively or operationally connected to the crankshaft of an internal combustion engine, whereby the centrifugal mass has a ring-shaped friction surface, a clutch housing fastened to the centrifugal mass, an application plate which is installed non-rotationally in the clutch housing but which can move axially, whereby the application plate has a ring-shaped friction surface which essentially axially overlaps or covers the friction surface of the centrifugal mass, a clutch spring for the application of an axial force to the application plate toward the centrifugal mass, with the interposition of a clutch disc with friction lining rings which are non-rotationally connected to a hub - possibly with the interposition of a torsional damping device - characterized by the fact that there is a carrier 13 to 15 which is non-rotationally connected to the hub 11, which carrier 13 to 15 extends, starting from the hub 11, outward into the area of the friction surfaces 4 and 7, and on each side has a friction lining ring 16 with corresponding matching or mating friction surfaces 4' and 7', whereby the two friction lining rings 16 have an essentially constant material thickness over their radial extension, and extend in at least one radial direction beyond the friction surfaces 4 and 7, and are riveted to the carrier 13 to 15 in this area.

Another feature of the invention resides broadly in the friction clutch characterized by the fact that the carrier 13 consists of individual lining springs 14, 15 distributed on the periphery, which lining springs have tabs 30, 31 inside the friction surfaces 4 and 7 pointing in the peripheral direction and webs 29 which run essentially radially and create the connection to the hub 11 or to the torsional damper 12 and whereby there are rivet holes 33 at least in tongues 32 which project radially out of the tabs 30, 31 and which extend to radially outside the friction surfaces 4 and 7.

Yet another feature of the invention resides broadly in the friction clutch characterized by the fact that there is also a rivet hole 33 in the web 29.

Still another feature of the invention resides broadly in the friction clutch characterized by the fact that the application plate 6 and the centrifugal mass 2, in the area in which the friction lining rings 16 extend beyond the friction surfaces 4, 7, have recesses 26, 27 and the recesses 26, 27 emerge or transition by means of inclinations into the friction surfaces 4, 7 at an obtuse angle (alpha).

A further feature of the invention resides broadly in the friction clutch characterized by the fact that the edges are interrupted or discontinuous in the vicinity of the transition from the inclinations to the friction surface 4, 7.

Another feature of the invention resides broadly in the friction clutch characterized by the fact that the carrier 13 is realized in the form of a sheet metal part with friction lining rings 16 located on both sides, whereby radially inside and/or radially outside the projections of the friction surfaces 4, 7, rivets 20 connect the first or the second friction lining ring 16 to the carrier 13.

Yet another feature of the invention resides broadly in the friction clutch characterized by the fact that each friction lining ring 16–19, peripherally offset from the fastening openings 23, 35 has notches 24, 37 and the two friction lining rings are peripherally offset so that each rivet 20 is in contact by means of its set head or formed head 21 with the outside of the one friction lining ring and penetrates the fastening opening 23, 35 and the rivet hole 33 by means of its shank, and is in contact by means of its closing head or clinching head 22 on the side of the carrier farther from the friction lining ring, and is located in the notch 24, 37 of the other friction lining ring.

The surfaces of the friction lining rings are gradually used and worn away as the ring surfaces make contact with the flywheel and application plate as the clutch is engaged. After repeated uses, the surfaces of the rings become worn to the extent that friction lining ring replacement is necessary. In conventional friction lining rings, the friction lining rings could only be worn down to approximately one-half their total thickness before replacement was necessary. Replacement of half worn friction lining rings was then necessary since further wear would expose the friction lining ring fasteners or rivet heads and thus permit the rivet heads to contact the flywheel or application plate. This is not desirable since the exposed rivet heads will gouge the friction surfaces of the flywheel or application plate. The gouging will cause damage and result in costly repairs to the friction surfaces of the flywheel or application plate. In contrast, one embodiment of the present invention allows the friction surfaces of the friction lining ring to wear through essentially the entire thickness of the friction lining ring. The relocation of the fastening areas of the friction lining rings to a location beyond the friction surfaces allows a greater thickness and total volume of the friction lining rings to be used. This is possible since there are no fasteners between the wear surface of the friction lining ring and the carrier and essentially the entire thickness of the friction lining ring is available for wear.

In contrast, conventional friction lining rings can have many holes throughout their friction surface. Fasteners are inserted through the holes to attach the friction lining rings to a carrier. Uneven wear of the surface of the friction lining ring may result from the discontinuity of the surface due to the location of the holes. In one embodiment of the present invention, friction lining rings without holes in their friction surface, can wear more uniformly across their entire surface, since the surface is continuous. The entire surface of the friction lining ring can remain in constant contact with the opposing surface of the flywheel or application plate. In this context, constant contact of the surfaces should enable more consistent wear over the entire surface area of the friction lining ring.

When wear is not uniform over the entire surface area of the friction lining ring, as can occur in conventional friction lining rings, areas of high and low wear can develop. The areas of high wear can cause "hot spots" to develop on the surfaces of the friction lining rings, flywheel or application plate. These "hot spots" are caused by greater friction and therefore the release of greater heat in areas of high wear relative to surrounding areas. The "hot spots" can cause damage to the friction lining rings, flywheel or application plate. The friction surfaces of an embodiment of the present invention will not develop "hot spots" as readily as conventional friction surfaces, since wear is uniform and consistent across the friction surfaces of the friction lining rings.

The stability of the friction lining rings may be improved when the holes are removed from the friction surface areas. In known friction lining rings, cracks may develop around the holes in the friction surfaces of friction lining rings. These cracks often develop from the concentration of stress, as pressure is applied to the friction lining ring as the clutch is engaged. In known friction lining rings, the stress in the friction lining rings under pressure may be concentrated at the edges of the holes. Moreover, the thickness of the friction lining ring is at a minimum at the edges of the holes. It thereby becomes possible for the friction lining rings to crack under the application of a high stress. In one embodiment of the present invention, the friction lining rings are fastened to a carrier beyond the friction surface. In this case, the stress can be distributed over the entire thickness of the friction lining rings, in contrast to the minimal rivet hole thickness of known friction lining rings. As a result of the advantageous fastening location of the present invention, the stress can be distributed over a greater area, and thus reduced, while improving the stability of the friction lining rings.

In conventional friction lining rings, foreign material, including road dirt, friction lining ring dust from wear and ring cuttings, may become trapped in the holes of the friction surfaces of the friction lining rings. This material may accumulate in the holes and gouge the friction surfaces of the flywheel or application plate causing poor disc performance or damage. However, in one embodiment of the present invention, when the fastening means are located beyond the friction surface areas, foreign material cannot become trapped in the rivet holes to damage the friction surfaces.

In conventional friction lining rings, the friction surface area of the friction lining rings is effectively reduced by the total area of the many holes on the surface. The surface area of the friction lining ring is often larger than design requirements because of the surface area lost due to the holes on the surface. One embodiment of the present invention provides that the active friction surface area of the friction lining rings is effectively increased, when the fastening holes are relocated to areas beyond the friction surface. Therefore, the active friction surface of the present invention does not have holes. The active or working friction surface is the total surface area of the friction lining rings that makes contact with the surface of the flywheel or application plate. Therefore, the friction surface areas of the flywheel and application plate may be reduced as well, since the friction surface area of the friction lining ring has been effectively increased. Thus, it is also possible to reduce the total size and friction surface areas of the flywheel and the application plate. This size reduction can be achieved since the total friction surface area, of each component, is used when the clutch is engaged. The reduction in the size and weight of the flywheel and application plate may allow additional cost savings during the manufacturing process and may result in improvements in the performance of the motor vehicle.

The space available for the installation of clutch systems continues to decrease as additional components are forced into more compact space. Therefore, it is becoming increasingly necessary to reduce the axial length of the clutch components. Conventional friction lining rings may only be worn down to approximately one-half their total thickness before replacement is necessary. One embodiment of the present invention enables a reduced thickness of the friction lining rings, since essentially the entire thickness of the friction lining rings can be utilized for wear. Since a greater proportion of the thickness of the ring is available for wear, thinner friction lining rings can be used. In this context, the axial length of the clutch disc assembly may be effectively reduced. The reduction in friction lining ring thickness thereby enables the axial length of the clutch system to be reduced.

In one embodiment of the present invention, the fastening openings in the friction lining rings are realized in the form of radial slots. The tolerances required when fastening the friction lining rings through slots are often much less demanding than those which are permissible for holes. A slot provides adjustment freedom in two directions, radially in and out, while a circular rivet hole allows for a minimal variation of size. The reduced tolerance requirement enables a simple and less costly manufacturing process to be employed. In addition, improved balancing of the clutch disc is provided through the use of fastening openings in the form of slots. The slots enable a greater degree of freedom in fastening when compared to a hole. The use of slots also enables the balancing of the clutch disc to be simplified since there is a greater allowance for adjustment.

The mass moment of inertia of the clutch disc may also be reduced. In this context, the fastening means of the friction lining rings are located closer to the axis of rotation than in conventional friction lining rings. The fastening means for the friction lining rings, in the form of rivets, are generally more dense and therefore heavier than the friction lining ring material. The relocation of the heavier rivets closer to the axis of rotation may provide a reduction of the power required to accelerate the disc when the clutch is engaged. Therefore, the relocation of the denser rivets, closer to the axis of rotation, may reduce the mass moment of inertia and also provide for smoother starts. The clutch disc may also be better balanced as a result of this configuration.

Examples of clutches and components therefore which may be utilized in accordance with the present invention may be found in the following documents: U.S. patent application Ser. No. 08/221372 filed on Mar. 31, 1994 entitled "FLYWHEEL & CLUTCH SYSTEM", having inventors Bernhard SCHIERLING and Hilmar GOBEL, issued as U.S. Pat. No. 5,476,166 on Dec. 19, 1995, which corresponds to Federal Republic of Germany patent application No. P 43 11 102, filed on Apr. 3, 1993, which corresponds to DE-OS 43 11 102 and DE-PS 43 11 102; U.S. patent application Ser. No. 08/360455 filed on Dec. 21, 1994 entitled "FRICTION CLUTCH FOR A MOTOR VEHICLE", having inventor Harald JEPPE, which corresponds to Federal Republic of Germany patent application No. P 43 44 124, filed on Dec. 23, 1993, which corresponds to DE-OS 43 44 124 and DE-PS 43 44 124; U.S. patent application Ser. No. 08/405139 filed on Mar. 16, 1995 entitled "A MOTOR VEHICLE MANUAL TRANSMISSION WITH A CLUTCH WHICH CLUTCH HAS A FASTENING STRUCTURE FOR FASTENING THE LINING SPRING SEGMENTS TO THE DRIVING PLATE", having inventors Jens SCHNEIDER and Harald JEPPE, which corresponds to Federal Republic of Germany patent application No. P 44 09 253, filed on Mar. 18, 1994, which corresponds to DE-OS 44 09 253 and DE-PS 44 09 253; U.S. patent application Ser. No. 08/438709 filed on May 11, 1995 entitled "CLUTCH ASSEMBLY FOR A MOTOR VEHICLE HAVING A FLEXIBLE CLUTCH DISC", having inventors Joachim LINDNER, Jorg SUDAU, and Bernhard SCHIERLING, which corresponds to Federal Republic of Germany patent application No. P 44 16 949, filed on May 13, 1994, which corresponds to DE-OS 44 16 949 and DE-PS 44 16 949; U.S. patent application Ser. No. 08/499305 filed on Jul. 7, 1995 entitled "CLUTCH DISC OF A MOTOR VEHICLE, WHICH CLUTCH DISC HAS AN ELASTIC CONNECTION BETWEEN THE CARRIER PLATE & HUB", having inventors Klaus MEMMEL, Gunter WAWRZIK, Winfried STURMER, and Harald JEPPE, which corresponds to Federal Republic of Germany patent application No. P 44 24 186, filed on Jul. 8, 1994, which corresponds to DE-OS 44 24 186 and DE-PS 44 24 186; U.S. patent application Ser. No. 08/502401 filed on Jul. 14, 1995 entitled "A TRANSMISSION OF AN INTERNAL COMBUSTION ENGINE WITH A CLUTCH WITH A TWO-MASS FLYWHEEL", having inventors Michael WEISS, Jorg SUDAU, Bernhard SCHIERLING, Thomas WIRTH, Jurgen KLEIFGES, Reinhard FELDHAUS, Andreas ORLAMUNDER, and Eberhard KNAUPP, which corresponds to Federal Republic of Germany patent application No. P 195 19 363, filed on May 26, 1995, which corresponds to DE-OS 195 19 363 and DE-PS 195 19 363; U.S. patent application Ser. No. 08/504848 filed on Jul. 20, 1995 entitled "AIR-COOLED FLYWHEEL & A FRICTION CLUTCH FOR A TRANSMISSION OF A MOTOR VEHICLE, THE FLYWHEEL HAVING TWO CENTRIFUGAL MASSES", having inventors Bernhard SCHIERLING, Rudolf BAUERLEIN, Cora CARLSON, and Hilmar GOBEL, which corresponds to Federal Republic of Germany patent application No. P 44 25 570, filed on Jul. 20, 1994, which corresponds to DE-OS 44 25 570 and DE-PS 44 25 570; U.S. patent application Ser. No. 08/515263 filed on Aug. 15, 1995 entitled "A FLYWHEEL FOR THE FRICTION CLUTCH OF A MOTOR VEHICLE, THE FLYWHEEL HAVING TWO CENTRIFUGAL MASSES & A FRICTION DEVICE", having inventors Joachim LINDNER and Bernhard SCHIERLING, which corresponds to Federal Republic of Germany patent application No. P 44 28 832, filed on Aug. 17, 1994, which corresponds to DE-OS 44 28 832 and DE-PS 44 28 832; U.S. patent application Ser. No. 08/515348 filed on Aug. 15, 1995 entitled "FRICTION CLUTCH FOR THE TRANSMISSION OF A MOTOR VEHICLE & A FLYWHEEL ASSEMBLY FOR A FRICTION CLUTCH", having inventors Joachim LINDNER and Bernhard SCHIERLING, which corresponds to Federal Republic of Germany patent application No. P 44 28 829, filed on Aug. 17, 1994, which corresponds to DE-OS 44 28 829 and DE-PS 44 28 829; and U.S. patent application Ser. No. 08/518789 filed on Aug. 23, 1995 entitled "FRICTION CLUTCH ASSEMBLY FOR A MOTOR VEHICLE, THE FRICTION CLUTCH ASSEMBLY HAVING A CLUTCH PLATE WITH DIVIDED HUB DISC", having inventors Klaus MEMMEL, Jurgen KLEIFGES, Reinhard FELDHAUS, and Harald JEPPE, which corresponds to Federal Republic of Germany patent application No. P 44 29 870, filed on Aug. 23, 1994, which corresponds to DE-OS 44 29 870 and DE-PS 44 29 870. These patents and patent applications are hereby incorporated by reference as if set forth in their entirety herein. All of the above U.S. patent documents in this paragraph are assigned to Fichtel & Sachs AG of the Federal Republic of Germany.

Types of transmissions in which the present invention may be incorporated may be disclosed in the following U.S. Patents: U.S. Pat. No. 5,199,316 to Hoffman on Apr. 6, 1993, entitled "Fully-synchronized Multiple Speed Manual Transmission for Motor Vehicles"; U.S. Pat. No. 4,458,551 to Winter on Jul. 10, 1984, entitled "Manual Transmission"; and U.S. Pat. No. 3,858,460 to Porter et al. on Jan. 1, 1975, entitled "Four Speed Manual Transmission and Control".

Types of clutch assemblies in which the present invention may be utilized may be disclosed in the following U.S. Patents: U.S. Pat. No. 4,684,007 to Maucher on Aug. 4, 1987, entitled "Clutch Plate"; U.S. Pat. No. 4,635,780 to Wiggen on Jan. 13, 1987, entitled "Clutch Disc for a Motor Vehicle Friction Clutch"; and U.S. Pat. No. 4,651,857 to Schraut et al. on Mar. 24, 1987, entitled "Clutch Disc Unit for a Motor Vehicle Clutch".

Types of two-mass flywheels in which the present invention may be utilized may be disclosed in the following U.S. Patents: U.S. Pat. No. 5,103,688 to Kuhne on Apr. 14, 1992, entitled "Two-mass Flywheel"; U.S. Pat. No. 4,777,843 to Bopp on Oct. 18, 1988, entitled "Two-mass Flywheel Assembly with Viscous Damping Assembly"; U.S. Pat. No. 5,195,396 to Kamiya et al. on Mar. 23, 1993, entitled "Torque Variation Absorbing Device"; and U.S. Pat. No. 4,946,420 to Jackel on Aug. 7, 1990, entitled "Apparatus for Damping Torsional Vibrations".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. 195 14 817, filed on Apr. 21, 1995, having inventors Jürgen Kleifges, Bernhard Schierling, and Harald Jeppe, and DE-OS 195 14 817 and DE-PS 195 14 817, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle, said friction clutch comprising:
   a flywheel, said flywheel having an axis of rotation defining an axial direction parallel to the axis of rotation;
   a clutch housing;
   a clutch disc;
   a pressure plate for engaging and disengaging said clutch disc with said flywheel;
   said clutch disc being disposed between said flywheel and said pressure plate;
   an arrangement to fasten said pressure plate to said clutch housing;
   an arrangement to engage said pressure plate and said flywheel with said clutch disc;
   said clutch disc comprising:
      a hub;
      a friction lining arrangement;
      a carrier to connect said friction lining arrangement to one of said hub and a torsional damper disposed at said hub;
      said friction lining arrangement comprising a first portion;
      said first portion having a first friction surface;
      said friction lining arrangement comprising a second portion disposed adjacent to said first portion;
      said first portion being substantially in contact with said flywheel upon engagement of said clutch disc;
      said friction lining arrangement comprising a third portion;
      said third portion having a second friction surface;
      said friction lining arrangement comprising a fourth portion adjacent to said third portion;
      said third portion being substantially in contact with said pressure plate upon engagement of said clutch disc;
      a first connecting arrangement to connect said friction lining arrangement to said carrier;
      said first portion, having said first friction surface disposed thereon, being without metal fastening elements therein;
      said third portion, having said second friction surface disposed thereon, being without metal fastening elements therein;
   said friction lining arrangement comprising a first friction lining ring;
   said first friction surface being disposed on said first friction lining ring;

said friction lining arrangement comprising a second friction lining ring;

said second friction surface being disposed on said second friction lining ring;

said carrier comprising a plurality of lining springs;

each of said plurality of lining springs comprising a second connecting arrangement to connect said friction lining arrangement to said hub;

each of said plurality of lining springs being disposed substantially between said first friction lining ring and said second friction lining ring;

said first friction lining ring comprising a plurality of fastening openings, each of said fastening openings of said first friction lining ring being disposed circumferentially around said first friction lining ring;

said second friction lining ring comprising a plurality of fastening openings, each of said fastening openings of said second friction lining ring being disposed circumferentially around said second friction lining ring;

each of said plurality of lining springs further comprising at least one tab;

said at least one tab extending in a substantially circumferential direction;

said at least one tab comprising a tongue;

said at least one tab and said tongue being disposed between said first friction lining ring and said second friction lining ring;

said tongue extending radially inwardly from said at least one tab;

said tongue comprising at least one rivet hole;

said first connecting arrangement comprising a plurality of rivets;

said at least one rivet hole being circumferentially aligned with a corresponding one of said fastening openings of one of: said first friction lining ring and said second friction lining ring; and one of said rivets being disposed in said corresponding one of said fastening openings of said one of: said first friction lining ring and said second friction lining ring to connect said one of: said first friction lining ring and said second friction lining ring to said tongue.

2. Friction clutch as claimed in claim 1, wherein:

said first friction lining ring comprises an additional surface, disposed opposite to said first friction surface;

said first friction lining ring having a thickness defined between said first friction surface and said additional surface of said first friction lining ring;

said thickness of said first friction lining ring being essentially constant between said first friction surface and said additional surface of said first friction lining ring;

said second friction lining ring comprises an additional surface, disposed opposite to said second friction surface;

said second friction lining ring having a thickness defined between said second friction surface and said additional surface of said second friction lining ring; and said thickness of said second friction lining ring being essentially constant between said second friction surface and said additional surface of said second friction lining ring.

3. Friction clutch as claimed in claim 2, wherein:

said flywheel comprises an annular shaped friction surface;

said flywheel friction surface has a first inner radius and a first outer radius;

said pressure plate comprises an annular shaped friction surface;

said pressure plate friction surface has a second inner radius and a second outer radius;

said first friction surface has an annular shape;

said first friction surface has a third inner radius and a third outer radius;

said third inner radius of said first friction surface is disposed adjacent to said first inner radius of said flywheel;

said third outer radius of said first friction surface is disposed adjacent to said first outer radius of said flywheel;

said second friction surface has an annular shape;

said second friction surface has a fourth inner radius and a fourth outer radius;

said fourth inner radius of said second friction surface is adjacent to said second inner radius of said pressure plate;

said fourth outer radius of said second friction surface is adjacent to said second outer radius of said pressure plate;

said first outer radius of said flywheel friction surface is substantially greater than said first inner radius of said flywheel friction surface;

said second outer radius of said pressure plate friction surface is substantially greater than said second inner radius of said pressure plate friction surface;

said third outer radius of said first friction surface is substantially greater than said third inner radius of said first friction surface; and said fourth outer radius of said second friction surface is substantially greater than said fourth inner radius of said second friction surface.

4. Friction clutch as claimed in claim 3, wherein:

said pressure plate comprises a first surface;

said first surface being disposed adjacent to said second inner radius of said pressure plate friction surface;

said first surface being concentric with respect to the axis of rotation;

said first surface being disposed at an obtuse angle with respect to said pressure plate friction surface to thereby provide for a non-sticking release of said pressure plate from said friction lining arrangement, upon wear of said friction lining arrangement;

said first surface being angled in a direction away from said friction lining arrangement and having a first length dimension; and the first length dimension of said first surface being sufficiently large to provide axial and radial clearance for said first connecting arrangement.

5. Friction clutch as claimed in claim 4, wherein:

said flywheel comprises a second surface;

said second surface being disposed adjacent to said first inner radius of said flywheel friction surface;

said second surface being concentric with respect to the axis of rotation;

said second surface being disposed at an obtuse angle with respect to said flywheel friction surface to thereby provide for a non-sticking release of said flywheel from said friction lining arrangement, upon wear of said friction lining arrangement;

said second surface being angled in a direction away from said friction lining arrangement and having a second length dimension; and the second length dimension of said second surface being sufficiently large to provide axial and radial clearance for said first connecting arrangement.

6. Friction clutch as claimed in claim 5 wherein:

said second connecting arrangement comprises a foot;

said foot of said second connecting arrangement being attached to said hub;

each of said plurality of lining springs further comprises a web;

said web extending between said foot and said at least one tab; and said web comprises a rivet hole, said rivet hole of said web being disposed at substantially the same distance from the axis of rotation as said at least one rivet hole of said tongue.

7. Friction clutch as claimed in claim 6 wherein:

said first friction lining ring comprises a plurality of notches;

said second friction lining ring comprises a plurality of notches;

each of said notches of said first friction lining ring being disposed both circumferentially between, and peripherally offset from, each of said fastening openings of said first friction lining ring;

each of said notches of said second friction lining ring being disposed both circumferentially between, and peripherally offset from, each of said fastening openings of said second friction lining ring;

each of said notches of said first friction lining ring being disposed in substantial circumferential alignment with one of said fastening openings of said second friction lining ring;

each of said notches of said second friction lining ring being disposed in substantial circumferential alignment with one of said fastening openings of said first friction lining ring;

each of said plurality of lining springs further comprises a first side and a second side disposed opposite said first side;

said first friction lining ring being disposed adjacent to said first side of each of said plurality of lining springs;

said second friction lining ring being disposed adjacent to said second side of each of said plurality of lining springs;

each of said rivets comprises a shank having a longitudinal axis;

said shank comprises a first end and a second end disposed an axial distance from said first end;

said first end of said shank comprises a set head;

said second end of said shank comprises a closing head;

said at least one tab comprises two tabs, said two tabs being a first tab and a second tab;

said shank of some of said rivets being disposed to pass through corresponding ones of said fastening openings of said first friction lining ring;

said shank of said some of said rivets also being disposed through said at least one rivet hole of said tongue of said first tab;

said set head of said shank of said some of said rivets being configured to attach said first friction lining ring to said first side of each of said plurality of lining springs;

said closing head of said shank of said some of said rivets being disposed on said second side of each of said plurality of lining springs;

said closing head of said shank of said some of said rivets being disposed in a corresponding one of said notches of said second friction lining ring;

said shank of additional ones of said rivets being disposed through corresponding ones of said fastening openings of said second friction lining ring;

said shank of said additional ones of said rivets also being disposed through said at least one rivet hole of said tongue of said second tab;

said set head of said shank of said additional ones of said rivets being configured to attach said second friction lining ring to said second side of each of said plurality of lining springs;

said closing head of said shank of said additional ones of said rivets being disposed on said first side of each of said plurality of lining springs; and said closing head of said shank of said additional ones of said rivets being disposed in a corresponding one of said notches of said first friction lining ring.

8. Friction clutch as claimed in claim 7, further comprising one of the following sets of features a), b) and c):

a) said second portion of said friction lining arrangement being disposed radially inside said third inner radius of said first friction surface;

said fourth portion of said friction lining arrangement being disposed radially inside said fourth inner radius of said second friction surface;

said rivets of said first connecting arrangement being disposed on said second portion of said friction lining arrangement;

said rivets of said first connecting arrangement being disposed on said fourth portion of said friction lining arrangement;

said first friction surface of said first friction lining ring and said second friction surface of said second friction lining ring being substantially without holes therethrough;

said first friction surface of said first friction lining ring being substantially unbroken by depressions extending through a substantial portion of the thickness of said first friction lining ring;

said second friction surface of said second friction lining ring being substantially unbroken by depressions extending through a substantial portion of the thickness of said second friction lining ring;

b) said second portion of said friction lining arrangement being disposed radially outside said third outer radius of said first friction surface;

said fourth portion of said friction lining arrangement being disposed radially outside said fourth outer radius of said second friction surface;

said rivets of said first connecting arrangement being disposed on said second portion of said friction lining arrangement;

said rivets of said first connecting arrangement being disposed on said fourth portion of said friction lining arrangement;

said first friction surface of said first friction lining ring and said second friction surface of said second friction lining ring being substantially without holes therethrough;

said first friction surface of said first friction lining ring being substantially unbroken by depressions extending through a substantial portion of the thickness of said first friction lining ring;

said second friction surface of said second friction lining ring being substantially unbroken by depressions extending through a substantial portion of the thickness of said second friction lining ring;

c) said second portion of said friction lining arrangement being disposed both radially inside said third inner radius of said first friction surface and also being disposed radially outside said third outer radius of said first friction surface;

said fourth portion of said friction lining arrangement being disposed both radially inside said fourth inner radius of said second friction surface and also being disposed radially outside said fourth outer radius of said second friction surface;

said rivets of said first connecting arrangement being disposed on said second portion of said friction lining arrangement;

said rivets of said first connecting arrangement being disposed on said fourth portion of said friction lining arrangement;

said first friction surface of said first friction lining ring and said second friction surface of said second friction lining ring being substantially without holes therethrough;

said first friction surface of said first friction lining ring being substantially unbroken by depressions extending through a substantial portion of the thickness of said first friction lining ring; and said second friction surface of said second friction lining ring being substantially unbroken by depressions extending through a substantial portion of the thickness of said second friction lining ring.

9. A friction clutch for a motor vehicle, said friction clutch comprising:

a flywheel, said flywheel having an axis of rotation defining an axial direction parallel to the axis of rotation;

a clutch housing;

a clutch disc;

a pressure plate for engaging and disengaging said clutch disc with said flywheel;

said clutch disc being disposed between said flywheel and said pressure plate;

an arrangement to fasten said pressure plate to said clutch housing;

an arrangement to engage said pressure plate and said flywheel with said clutch disc;

said clutch disc comprising:
 a hub;
 a friction lining arrangement;
 said friction lining arrangement comprising at least one friction lining ring;
 a carrier to connect said friction lining arrangement to one of said hub and a torsional damper disposed at said hub;
 said friction lining arrangement comprising a first portion;
 said first portion having a first friction surface;
 said friction lining arrangement comprising a second portion disposed adjacent to said first portion;

said first portion being substantially in contact with said flywheel upon engagement of said clutch disc;

said friction lining arrangement comprising a third portion;

said third portion having a second friction surface;

said friction lining arrangement comprising a fourth portion disposed adjacent to said third portion;

said third portion being substantially in contact with said pressure plate upon engagement of said clutch disc;

a first connecting arrangement to connect said friction lining arrangement to said carrier;

said first connecting arrangement being disposed at said second portion;

said first connecting arrangement being disposed at said fourth portion;

said at least one friction lining ring comprising a first friction lining ring and a second friction lining ring;

said first friction surface being disposed on said first friction lining ring;

said second friction surface being disposed on said second friction lining ring;

said carrier comprising a plurality of lining springs;

each of said plurality of lining springs comprising a second connecting arrangement to connect said friction lining arrangement to said hub;

each of said plurality of lining springs being disposed substantially between said first friction lining ring and said second friction lining ring;

said first friction lining ring comprising a plurality of fastening openings, each of said fastening openings of said first friction lining ring being disposed circumferentially around said first friction lining ring;

said second friction lining ring comprising a plurality of fastening openings, each of said fastening openings of said second friction lining ring being disposed circumferentially around said second friction lining ring;

each of said plurality of lining springs further comprising at least one tab;

said at least one tab extending in a substantially circumferential direction;

said at least one tab comprising a tongue;

said at least one tab and said tongue being disposed between said first friction lining ring and said second friction lining ring;

said tongue extending radially inwardly from said at least one tab;

said tongue comprising at least one rivet hole;

said first connecting arrangement comprising a plurality of rivets;

said at least one rivet hole being circumferentially aligned with a corresponding one of said fastening openings of one of: said first friction lining ring and said second friction lining ring; and one of said rivets being disposed in said corresponding one of said fastening openings of said one of: said first friction lining ring and said second friction lining ring to connect said one of: said first friction lining ring and said second friction lining ring to said tonque.

10. Friction clutch as claimed in claim 9, wherein:

said flywheel comprises an annular shaped friction surface;

said flywheel friction surface has a first inner radius and a first outer radius;

said pressure plate comprises an annular shaped friction surface;

said pressure plate friction surface has a second inner radius and a second outer radius;

said first friction surface has an annular shape;

said first friction surface has a third inner radius and a third outer radius;

said third inner radius of said first friction surface is disposed adjacent to said first inner radius of said flywheel;

said third outer radius of said first friction surface is disposed adjacent to said first outer radius of said flywheel;

said second friction surface has an annular shape;

said second friction surface has a fourth inner radius and a fourth outer radius;

said fourth inner radius of said second friction surface is disposed adjacent to said second inner radius of said pressure plate;

said fourth outer radius of said second friction surface is disposed adjacent to said second outer radius of said pressure plate;

said first outer radius of said flywheel friction surface is substantially greater than said first inner radius of said flywheel friction surface;

said second outer radius of said pressure plate friction surface is substantially greater than said second inner radius of said pressure plate friction surface;

said third outer radius of said first friction surface is substantially greater than said third inner radius of said first friction surface; and said fourth outer radius of said second friction surface is substantially greater than said fourth inner radius of said second friction surface.

11. Friction clutch as claimed in claim 10, wherein:

said first friction lining ring comprises an additional surface, disposed opposite to said first friction surface;

said first friction lining ring having a thickness defined between said first friction surface and said additional surface of said first friction lining ring;

said thickness of said first friction lining ring being essentially constant between said first friction surface and said additional surface of said first friction lining ring;

said second friction lining ring comprises an additional surface, disposed opposite to said second friction surface;

said second friction lining ring having a thickness defined between said second friction surface and said additional surface of said second friction lining ring;

said thickness of said second friction lining ring being essentially constant between said second friction surface and said additional surface of said second friction lining ring;

said pressure plate comprises a first surface;

said first surface being disposed adjacent to said second inner radius of said pressure plate friction surface;

said first surface being concentric with respect to the axis of rotation;

said first surface being disposed at an obtuse angle with respect to said pressure plate friction surface to thereby provide for a non-sticking release of said pressure plate from said friction lining arrangement, upon wear of said friction lining arrangement;

said first surface being angled in a direction away from said friction lining arrangement and having a first length dimension; and the first length dimension of said first surface being sufficiently large to provide axial and radial clearance for said first connecting arrangement.

12. Friction clutch as claimed in claim 11, wherein:

said flywheel comprises a second surface;

said second surface being disposed adjacent to said first inner radius of said flywheel friction surface;

said second surface being concentric with respect to the axis of rotation;

said second surface being disposed at an obtuse angle with respect to said flywheel friction surface to thereby provide for a non-sticking release of said flywheel from said friction lining arrangement, upon wear of said friction lining arrangement;

said second surface being angled in a direction away from said friction lining arrangement and having a second length dimension; and the second length dimension of said second surface being sufficiently large to provide axial and radial clearance for said first connecting arrangement.

13. Friction clutch as claimed in claim 12 wherein:

said second connecting arrangement comprises a foot;

said foot of said second connecting arrangement being attached to said hub;

each of said plurality of lining springs further comprises a web;

said web extending between said foot and said at least one tab;

said web comprises a rivet hole, said rivet hole of said web being disposed at substantially the same distance from the axis of rotation as said at least one rivet hole of said tongue;

said first friction lining ring comprises a plurality of notches;

said second friction lining ring comprises a plurality of notches;

each of said notches of said first friction lining ring being disposed both circumferentially between, and peripherally offset from, each of said fastening openings of said first friction lining ring;

each of said notches of said second friction lining ring being disposed both circumferentially between, and peripherally offset from, each of said fastening openings of said second friction lining ring;

each of said notches of said first friction lining ring being disposed in substantial circumferential alignment with one of said fastening openings of said second friction lining ring;

each of said notches of said second friction lining ring being disposed in substantial circumferential alignment with one of said fastening openings of said first friction lining ring;

each of said plurality of lining springs further comprises a first side and a second side disposed opposite said first side;

said first friction lining ring being disposed adjacent to said first side of each of said plurality of lining springs;

said second friction lining ring being disposed adjacent to said second side of each of said plurality of lining springs;

23 each of said rivets comprises a shank having a longitudinal axis;

said shank comprises a first end and a second end disposed an axial distance from said first end;

said first end of said shank comprises a set head;

said second end of said shank comprises a closing head;

said at least one tab comprises two tabs, said two tabs being a first tab and a second tab;

said shank of some of said rivets being disposed to pass through corresponding ones of said fastening openings of said first friction lining ring;

said shank of said some of said rivets also being disposed through said at least one rivet hole of said tongue of said first tab;

said set head of said shank of said some of said rivets being configured to attach said first friction lining ring to said first side of each of said plurality of lining springs;

said closing head of said shank of said some of said rivets being disposed on said second side of each of said plurality of lining springs;

said closing head of said shank of said some of said rivets being disposed in a corresponding one of said notches of said second friction lining ring;

said shank of additional ones of said rivets being disposed through corresponding ones of said fastening openings of said second friction lining ring;

said shank of said additional ones of said rivets also being disposed through said at least one rivet hole of said tongue of said second tab;

said set head of said shank of said additional ones of said rivets being configured to attach said second friction lining ring to said second side of each of said plurality of lining springs;

said closing head of said shank of said additional ones of said rivets being disposed on said first side of each of said plurality of lining springs;

said closing head of said shank of said additional ones of said rivets being disposed in a corresponding one of said notches of said first friction lining ring;

said friction clutch further comprising one of the following sets of features g), h) and i):

g) said second portion of said friction lining arrangement being disposed radially inside said third inner radius of said first friction surface;

said fourth portion of said friction lining arrangement being disposed radially inside said fourth inner radius of said second friction surface;

said rivets of said first connecting arrangement being disposed on said second portion of said friction lining arrangement;

said rivets of said first connecting arrangement being disposed on said fourth portion of said friction lining arrangement;

said first friction surface of said first friction lining ring and said second friction surface of said second friction lining ring being substantially without holes therethrough;

said first friction surface of said first friction lining ring being substantially unbroken by depressions extending through a substantial portion of the thickness of said first friction lining ring;

said second friction surface of said second friction lining ring being substantially unbroken by depressions

24 extending through a substantial portion of the thickness of said second friction lining ring;

h) said second portion of said friction lining arrangement being disposed radially outside said third outer radius of said first friction surface;

said fourth portion of said friction lining arrangement being disposed radially outside said fourth outer radius of said second friction surface;

said rivets of said first connecting arrangement being disposed on said second portion of said friction lining arrangement;

said rivets of said first connecting arrangement being disposed on said fourth portion of said friction lining arrangement;

said first friction surface of said first friction lining ring and said second friction surface of said second friction lining ring being substantially without holes therethrough;

said first friction surface of said first friction lining ring being substantially unbroken by depressions extending through a substantial portion of the thickness of said first friction lining ring; said second friction surface of said second friction lining ring being substantially unbroken by depressions extending through a substantial portion of the thickness of said second friction lining ring;

i) said second portion of said friction lining arrangement being disposed both radially inside said third inner radius of said first friction surface and also being disposed radially outside said third outer radius of said first friction surface;

said fourth portion of said friction lining arrangement being disposed both radially inside said fourth inner radius of said second friction surface and also being disposed radially outside said fourth outer radius of said second friction surface;

said rivets of said first connecting arrangement being disposed on said second portion of said friction lining arrangement;

said rivets of said first connecting arrangement being disposed on said fourth portion of said friction lining arrangement;

said first friction surface of said first friction lining ring and said second friction surface of said second friction lining ring being substantially without holes therethrough;

said first friction surface of said first friction lining ring being substantially unbroken by depressions extending through a substantial portion of the thickness of said first friction lining ring; and said second friction surface of said second friction lining ring being substantially unbroken by depressions extending through a substantial portion of the thickness of said second friction lining ring.

14. A friction clutch for a motor vehicle, said friction clutch comprising:

a flywheel, said flywheel having an axis of rotation defining an axial direction parallel to the axis of rotation;

a clutch housing;

a clutch disc;

a pressure plate for engaging and disengaging said clutch disc with said flywheel;

said clutch disc being disposed between said flywheel and said pressure plate;

an arrangement to fasten said pressure plate to said clutch housing;

an arrangement to engage said pressure plate and said flywheel with said clutch disc;

said clutch disc comprising:

a hub;

a friction lining arrangement;

said friction lining arrangement comprising at least one friction lining ring;

a carrier to connect said friction lining arrangement to one of said hub and a torsional damper disposed at said hub;

said friction lining arrangement comprising a first portion;

said first portion having a first friction surface;

said friction lining arrangement comprising a second portion disposed adjacent to said first portion;

said first portion being substantially in contact with said flywheel upon engagement of said clutch disc;

said friction lining arrangement comprising a third portion;

said third portion having a second friction surface;

said friction lining arrangement comprising a fourth portion disposed adjacent to said third portion;

said third portion being substantially in contact with said pressure plate upon engagement of said clutch disc;

a plurality of metal fastening elements connecting said friction lining arrangement to said carrier;

at least one of said metal fastening elements being disposed at said second portion; and at least one of said metal fastening elements being disposed at said fourth portion;

said at least one friction lining ring comprising a first friction lining ring;

said first friction surface being disposed on said first friction lining ring;

said second friction surface being disposed on said second friction lining ring;

said carrier comprising a plurality of lining springs;

each of said plurality of lining springs comprising a connecting arrangement to connect said friction lining arrangement to said hub;

each of said plurality of lining springs being disposed substantially between said first friction lining ring and said second friction lining ring;

said first friction lining ring comprising a plurality of fastening openings, each of said fastening openings of said first friction lining ring being disposed circumferentially around said first friction lining ring;

said second friction lining ring comprising a plurality of fastening openings, each of said fastening openings of said second friction lining ring being disposed circumferentially around said second friction lining ring;

each of said plurality of lining springs further comprising at least one tab;

said at least one tab extending in a substantially circumferential direction;

said at least one tab comprising a tongue;

said at least one tab and said tongue being disposed between said first friction lining ring and said second friction lining ring;

said tongue extending radially inwardly from said at least one tab;

said tongue comprising at least one rivet hole;

said at least one rivet hole being circumferentially aligned with a corresponding one of said fastening openings of one of: said first friction lining ring and said second friction lining ring; and one of said metal fastening elements being disposed in said corresponding one of said fastening openings of said one of: said first friction lining ring and said second friction lining ring to connect said one of: said first friction lining ring and said second friction lining ring to said tongue.

15. Friction clutch as claimed in claim 14, wherein said metal fastening elements comprise rivets.

16. Friction clutch as claimed in claim 15, wherein said rivets are disposed solely at said second portion and at said fourth portion of said friction lining arrangement.

17. Friction clutch as claimed in claim 16, wherein:

said flywheel comprises an annular shaped friction surface;

said flywheel friction surface has a first inner radius and a first outer radius;

said pressure plate comprises an annular shaped friction surface;

said pressure plate friction surface has a second inner radius and a second outer radius;

said first friction surface has an annular shape;

said first friction surface has a third inner radius and a third outer radius;

said third inner radius of said first friction surface is disposed adjacent to said first inner radius of said flywheel;

said third outer radius of said first friction surface is disposed adjacent to said first outer radius of said flywheel;

said second friction surface has an annular shape;

said second friction surface has a fourth inner radius and a fourth outer radius;

said fourth inner radius of said second friction surface is disposed adjacent to said second inner radius of said pressure plate;

said fourth outer radius of said second friction surface is disposed adjacent to said second outer radius of said pressure plate;

said first outer radius of said flywheel friction surface is substantially greater than said first inner radius of said flywheel friction surface;

said second outer radius of said pressure plate friction surface is substantially greater than said second inner radius of said pressure plate friction surface; said third outer radius of said first friction surface is substantially greater than said third inner radius of said first friction surface; and said fourth outer radius of said second friction surface is substantially greater than said fourth inner radius of said second friction surface.

18. Friction clutch as claimed in claim 7, wherein:

said first friction lining ring comprises an additional surface, disposed opposite to said first friction surface;

said first friction lining ring having a thickness defined between said first friction surface and said additional surface of said first friction lining ring;

said thickness of said first friction lining ring being essentially constant between said first friction surface and said additional surface of said first friction lining ring;

said second friction lining ring comprises an additional surface, disposed opposite to said second friction surface;

said second friction lining ring having a thickness defined between said second friction surface and said additional surface of said second friction lining ring;

said thickness of said second friction lining ring being essentially constant between said second friction surface and said additional surface of said second friction lining ring;

said pressure plate comprises a first surface;

said first surface being disposed adjacent to said second inner radius of said pressure plate friction surface;

said first surface being concentric with respect to the axis of rotation;

said first surface being disposed at an obtuse angle with respect to said pressure plate friction surface to thereby provide for a non-sticking release of said pressure plate from said friction lining arrangement, upon wear of said friction lining arrangement;

said first surface being angled in a direction away from said friction lining arrangement and having a first length dimension;

the first length dimension of said first surface being sufficiently large to provide axial and radial clearance for said rivets;

said flywheel comprises a second surface;

said second surface being disposed adjacent to said first inner radius of said flywheel friction surface;

said second surface being concentric with respect to the axis of rotation;

said second surface being disposed at an obtuse angle with respect to said flywheel friction surface to thereby provide for a non-sticking release of said flywheel from said friction lining arrangement, upon wear of said friction lining arrangement;

said second surface being angled in a direction away from said friction lining arrangement and having a second length dimension; and the second length dimension of said second surface being sufficiently large to provide axial and radial clearance for said rivets.

19. Friction clutch as claimed in claim 18 wherein:

said connecting arrangement comprises a foot;

said foot of said connecting arrangement being attached to said hub;

each of said plurality of lining springs further comprises a web;

said web extending between said foot and said at least one tab;

said web comprises a rivet hole, said rivet hole of said web being disposed at substantially the same distance from the axis of rotation as said at least one rivet hole of said tongue;

said first friction lining ring comprises a plurality of notches;

said second friction lining ring comprises a plurality of notches;

each of said notches of said first friction lining ring being disposed both circumferentially between, and peripherally offset from, each of said fastening openings of said first friction lining ring;

each of said notches of said second friction lining ring being disposed both circumferentially between, and peripherally offset from, each of said fastening openings of said second friction lining ring;

each of said notches of said first friction lining ring being disposed in substantial circumferential alignment with one of said fastening openings of said second friction lining ring;

each of said notches of said second friction lining ring being disposed in substantial circumferential alignment with one of said fastening openings of said first friction lining ring;

each of said plurality of lining springs further comprises a first side and a second side disposed opposite said first side;

said first friction lining ring being disposed adjacent to said first side of each of said plurality of lining springs;

said second friction lining ring being disposed adjacent to said second side of each of said plurality of lining springs;

each of said rivets comprises a shank having a longitudinal axis;

said shank comprises a first end and a second end disposed an axial distance from said first end;

said first end of said shank comprises a set head;

said second end of said shank comprises a closing head;

said at least one tab comprises two tabs, said two tabs being a first tab and a second tab;

said shank of some of said rivets being disposed to pass through corresponding ones of said fastening openings of said first friction lining ring;

said shank of said some of said rivets also being disposed through said at least one rivet hole of said tongue of said first tab;

said set head of said shank of said some of said rivets being configured to attach said first friction lining ring to said first side of each of said plurality of lining springs;

said closing head of said shank of said some of said rivets being disposed on said second side of each of said plurality of lining springs;

said closing head of said shank of said some of said rivets being disposed in a corresponding one of said notches of said second friction lining ring;

said shank of additional ones of said rivets being disposed through corresponding ones of said fastening openings of said second friction lining ring;

said shank of said additional ones of said rivets also being disposed through said at least one rivet hole of said tongue of said second tab;

said set head of said shank of said additional ones of said rivets being configured to attach said second friction lining ring to said second side of each of said plurality of lining springs;

said closing head of said shank of said additional ones of said rivets being disposed on said first side of each of said plurality of lining springs;

said closing head of said shank of said additional ones of said rivets being disposed in a corresponding one of said notches of said first friction lining ring;

said friction clutch further comprising one of the following sets of features m), n) and o):

m) said second portion of said friction lining arrangement being disposed radially inside said third inner radius of said first friction surface;

said fourth portion of said friction lining arrangement being disposed radially inside said fourth inner radius of said second friction surface;

said first friction surface of said first friction lining ring and said second friction surface of said second friction lining ring being substantially without holes therethrough;

said first friction surface of said first friction lining ring being substantially unbroken by depressions extending through a substantial portion of the thickness of said first friction lining ring;

said second friction surface of said second friction lining ring being substantially unbroken by depressions extending through a substantial portion of the thickness of said second friction lining ring;

n) said second portion of said friction lining arrangement being disposed radially outside said third outer radius of said first friction surface;

said fourth portion of said friction lining arrangement being disposed radially outside said fourth outer radius of said second friction surface;

said first friction surface of said first friction lining ring and said second friction surface of said second friction lining ring being substantially without holes therethrough;

said first friction surface of said first friction lining ring being substantially unbroken by depressions extending through a substantial portion of the thickness of said first friction lining ring;

said second friction surface of said second friction lining ring being substantially unbroken by depressions extending through a substantial portion of the thickness of said second friction lining ring;

o) said second portion of said friction lining arrangement being disposed both radially inside said third inner radius of said first friction surface and also being disposed radially outside said third outer radius of said first friction surface;

said fourth portion of said friction lining arrangement being disposed both radially inside said fourth inner radius of said second friction surface and also being disposed radially outside said fourth outer radius of said second friction surface;

said first friction surface of said first friction lining ring and said second friction surface of said second friction lining ring being substantially without holes therethrough;

said first friction surface of said first friction lining ring being substantially unbroken by depressions extending through a substantial portion of the thickness of said first friction lining ring; and said second friction surface of said second friction lining ring being substantially unbroken by depressions extending through a substantial portion of the thickness of said second friction lining ring.

* * * * *

UNITED STATES PATENT AND TRADEMARK OFFICE
CERTIFICATE OF CORRECTION

PATENT NO. : 5,779,017

DATED : July 14, 1998

INVENTOR(S) : Jurgen Kleifges, et. al.

It is certified that error appears in the above-identified patent and that said Letters Patent is hereby corrected as shown below:

Title page, item [56] insert-- under
FOREIGN PATENT DOCUMENTS

| | | DOCUMENT NUMBER | DATE | COUNTRY | CLASS | SUBCLASS | TRANSLATION YES | NO |
|---|---|---|---|---|---|---|---|---|
| | AL | 1 5 5 6 7 7 7 | 11/1979 | Great Britain | — | — | X | |
| | AM | 8 5 2 9 0 8 6 | 9/1986 | Fed. Rep. of Germany | — | — | | X |
| | AN | | | | | | | |
| | AO | | | | | | | |
| | AP | | | | | | | |

Signed and Sealed this

Tenth Day of November 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,779,017
DATED : July 14, 1998
INVENTOR(S) : Jürgen KLEIFGES, Bernhard SCHIERLING, Harald JEPPE It is certified that error appears in the above-identified patent and that said Letters Patent is hereby corrected as shown below:

In column 26, line 58, Claim 18, after 'claim', delete "7," and insert --17,--.

Signed and Sealed this

First Day of June, 1999

Attest:

Q. TODD DICKINSON

*Attesting Officer*    *Acting Commissioner of Patents and Trademarks*